Dec. 2, 1952      J. ADAMS, JR      2,620,016
METHOD OF MAKING FLEXIBLE POWER TRANSMISSION BELTS
Filed Sept. 8, 1951
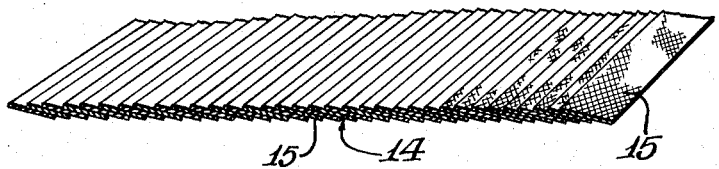
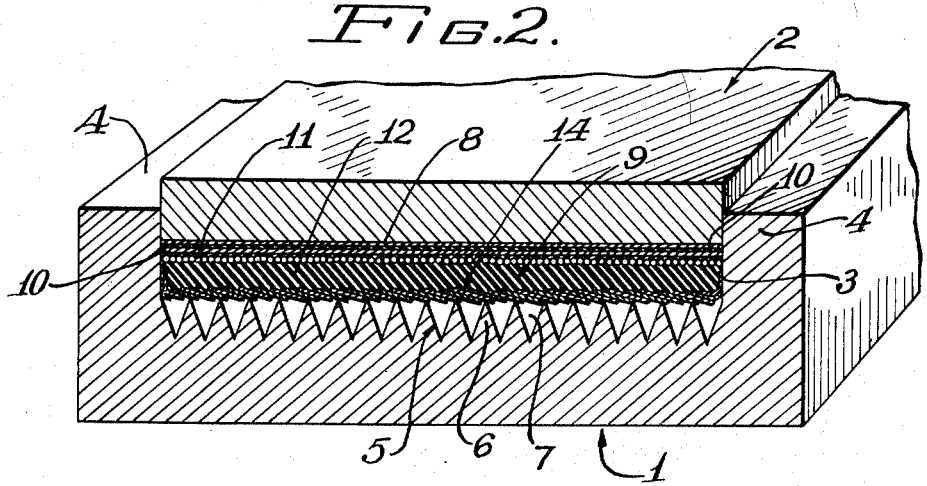
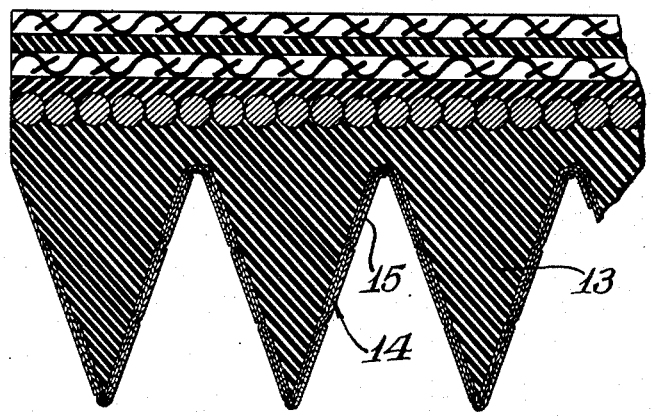
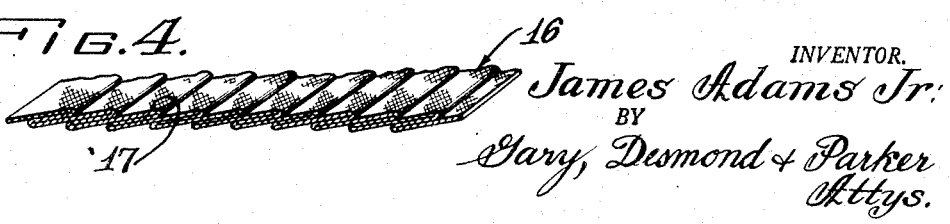
INVENTOR.
James Adams Jr.
BY
Gary, Desmond & Parker
Attys.

Patented Dec. 2, 1952

2,620,016

UNITED STATES PATENT OFFICE 2,620,016

METHOD OF MAKING FLEXIBLE POWER TRANSMISSION BELTS

James Adams, Jr., Passaic, N. J., assignor to Raybestos-Manhattan, Inc., Passaic, N. J., a corporation of New Jersey Application September 8, 1951, Serial No. 245,706

9 Claims. (Cl. 154—4)

1

This invention relates to improvements in a process of making multiple groove belts, and refers particularly to a process of making a flexible power transmission belt having on its working face a plurality of parallel ribs, preferably of substantially V cross-section, said ribs being enclosed or lined with a fabric liner.

In my copending patent application, Serial No. 266,194 filed January 12, 1952, I have shown and described a power transmission drive and belt therefor wherein the belt carries at its working face a plurality of parallel ribs, the ribs being parallel to the length of the belt. As described in said application for Letters Patent, the sectional shape of the ribs may be substantially any desired, but that a rib section which comprises substantially a V or triangular section is preferred.

In using such belt, the belt is trained around a pulley which is provided with a plurality of annular grooves, corresponding in number to the number of ribs upon the belt, the cross-section of each of said grooves being substantially the same as the cross-section of each of the ribs whereby the ribs register in the grooves and make complete contact with the walls of the pulley grooves, that is, no clearance space is contemplated between the belt ribs and the grooves during operation of the belt upon the pulley. In this fashion the radial thrust urging the belt toward the pulley during its passage around the pulley sets up a hydrostatic pressure in the ribs confined in the grooves, the ribs being formed of a substantially incompressible resilient material.

As mentioned hereinbefore, the ribs are constructed of a substantially incompressible resilient material, preferably rubber or a rubber compound, and inasmuch as the surface of the ribs contact the pulley grooves, it is desirable to confine the ribs with a fabric liner, preferably a rubberized fabric.

In said application for patent, hereinbefore mentioned, the importance of substantially complete registration and confinement of the belt ribs in the pulley grooves was stressed in order to secure the advantages of the hydrostatic pressure grip of the belt upon the pulley. Hence, the defining surfaces of the ribs, as well as the companion or mating surfaces of the grooves must be carefully formed.

I have found that in applying the rib-covering fabric liner to the ribs, which is done during the molding and curing of the ribs, difficulty is sometimes encountered, particularly when the

2 ratio of the zig-zag width, measured transversely across the ribs, to the planar width of the belt is great. In such cases, if a flat unitary sheet of fabric is employed for the rib liner there is a tendency for the fabric to be unduly stretched during the molding operation which sometimes results in tearing or rupturing of the fabric.

One of the important aspects of my present invention resides in a method of so lining the ribs during the molding operation as to eliminate undue stretching of the fabric and prevent tearing and rupturing of the fabric.

Briefly described the method of the present invention resides in forming the rib liner from a plurality of either separate or joined strips of fabric, the fabric strips being disposed in lateral overlapping relationship longitudinally parallel to the length of the ribs if separate strips are employed, or the strips may comprise pleats or folds, if joined strips are employed. In forming the liner, the overlapped or pleated strip liner is disposed between the rib molding elements and the resilient stock from which the ribs are formed. Upon the application of pressure and heat to the mold the belt ribs are formed with the strip liner enveloping the ribs. The stretching force, which in the case of the flat unitary liner tended to unduly stretch and tear the fabric liner, expends itself upon the strip or pleated liner by laterally shifting or slipping adjacent strips or pleats relative to each other.

Other objects and advantages of my invention will be apparent from the accompanying drawing and following detailed description.

In the drawing, Fig. 1 is a fragmentary perspective view of a plurality of separate fabric strips laterally overlapped to define a strip liner.

Fig. 2 is a fragmentary perspective view partly in section illustrating a belt carcass in a mold with the strip liner of Fig. 1 interposed between the rib-forming elements and the belt carcass.

Fig. 3 is an enlarged fragmentary transverse sectional view of a finished belt carrying a strip liner of the type shown in Fig. 1 over the ribs.

Fig. 4 is a fragmentary perspective view of a modified strip liner wherein the adjacent strips are joined in pleated or folded fashion.

Referring in detail to the drawing, 1 indicates a lower mold member and 2 indicates an upper mold member, the upper member being movable under pressure toward and away from the lower member. The lower mold member 1 is provided with a cavity 3 defined by walls 4 and a bottom 5, the latter having a plurality of ribs 6 alternately spaced with grooves 7. The upper mold member has a planar lower face 8 which is adapted to bear upon the non-working face of a belt carcass 9 adapted to be disposed in the cavity 3. Of course, conventional pressure means (not shown) is employed to urge the upper mold member toward the lower mold member to compress and form the belt carcass, and conventional heating means (not shown) may be employed to heat and cure the belt carcass during the molding operation.

The belt carcass 9 may comprise one or more fabric cover sheets 10, 10 which are usually and preferably rubberized. Beneath the fabric sheets 10, 10, a layer of strength members 11 may be positioned in a row parallel to the fabric sheets 10, 10. The strength members shown comprise a plurality of elongated, relatively strong cords which are disposed parallel to the length of the belt and coextensive therewith. Of course, any desired conventional form of strength layer is contemplated for purposes of the present invention since the invention is not dependent upon a specific kind of strength member and, in fact, is not dependent on the presence of a strength member at all.

It is contemplated that the belt formed by my process have longitudinal ribs upon the working face thereof. Hence, a relatively thick layer 12 of rubber or rubber composition is disposed beneath the strength layer 11, the material comprising the layer 12 being that which, in the finished belt, constitutes the ribs. Accordingly, the layer 12, when the carcass is positioned in the cavity, is disposed adjacent the rib forming members 6 and 7. Pressure urging the upper mold member 2 toward member 1 will cause the layer 12 to take the form of the bottom 5 of the cavity and, hence, a plurality of V or triangular sectioned ribs 13 will be formed upon the working face of the belt.

As has been hereinbefore described, it is desirable to line the ribs with a layer of fabric, preferably rubberized fabric. Accordingly, as a feature of the invention, prior to disposing the carcass 9 in the cavity 3, a layer of fabric 14 is disposed over the rib-forming elements 6 and 7, being disposed between said elements and the layer 12. The layer 14 may be formed of a plurality of separate strips 15 of fabric which are disposed in laterally overlapping relationship to one another in shingle fashion, the strips all being parallel to one another. The fabric layer 14 thus constituted is disposed in the cavity in such position that the strips 15 overlie, and are disposed parallel to, the rib-forming elements 6 and 7. If the strips are rubberized they will possess a degree of tackiness or adhesiveness whereby the layer 14 can conveniently be handled as a unitary layer.

When pressure has been applied to the upper mold member 2 to press the carcass and form the ribs 13, the layer 14 will be so acted upon by the rib-forming elements 6 and 7 as to define and traverse the outer surfaces of the ribs, as shown best in Fig. 3. It will be noted that the strips 15 are overlapped a major portion of their width prior to the rib-forming operation and that subsequently the original planar width of the layer is extended to cover the zig-zag width of the ribs. Hence, during the pressing operation, the strips move laterally away from each other to form this increased width. Preferably the degree of overlapping of the strips is correlated to the ratio of the planar width to the zig-zag width of the belt so that in the finished belt the layer 14 will overlie the ribs 13 in a double layer, as shown best in Fig. 3. Of course, the degree of overlapping of the strips 15 may be correlated to the ratio of the planar width and zig-zag width to result in substantially any desired degree of overlapping in the final rib liner, but it is desired that the lateral shifting of the strips during pressing be insufficient to cause lateral separation of the strips in the final rib liner.

In forming the layer 14, individual strips 15 of rubberized fabric may be laid in overlapping relationship, as shown best in Fig. 1. Under some circumstances it may be more convenient to wind a continuous rubberized strip upon a mandrel in a suitable spiraled overlapping relationship and to sever the layer thus formed upon the mandrel transversely to the wound strip. The overlapped layer may then be stripped from the mandrel. As another manner of forming the layer 14, a relatively wide strip of fabric which has been slit into strips of the desired width may be wound helically upon the mandrel and subsequently severed transversely to the length of the strips. Preferably, the weave of the strips 15 comprising the layer 14 is so disposed as to be diagonal with respect to the length and width of the strips so that a degree of transverse and longitudinal contraction or expansion of the strip may take place.

Referring particularly to Fig. 4, a strip liner 16 is shown wherein the strips are laterally joined together. In this form of liner a unitary sheet of fabric is pleated or folded to form overlapping pleated or folded strips 17. The liner 16 is employed in a manner similar to the liner 14 hereinbefore described, the pleats or folds 17 being laid substantially parallel to the rib-forming members in the mold. During the molding operation the lateral stretching force exerted by the rib-forming members expends itself in causing the pleats or folds 16 to slip laterally with respect to each other, thereby obviating tearing of the fabric. Preferably, the lines of folds or pleats are diagonal with respect to the fabric comprising the liner.

Although the present invention has been shown and described in conjunction with a multiple groove belt of the type contemplated in my copending patent application, hereinbefore mentioned, it need not be limited specifically to that type of belt since its advantages are inherent in the manufacture of any type of belt wherein a plurality of ribs are to be covered by a fabric liner. In addition, although V or triangular sectioned ribs are shown and described, the present invention is advantageous in the manufacture of belts with liner covered ribs of substantially any sectional shape.

I claim as my invention:

1. A method of making a flexible power transmission belt which comprises pressing a belt carcass comprising a resilient moldable material into molding contact with a ribbed mold to form a plurality of ribs upon a face of the carcass, and interposing a plurality of fabric strips disposed in lateral overlapping relationship with respect to one another and substantially parallel to the mold ribs between the carcass and the ribbed mold prior to the pressing operation to press a fabric liner over the surfaces of the carcass ribs.

2. A method as contemplated in claim 1 wherein the lateral strips are individual strips.

3. A method as contemplated in claim 1 wherein the lateral strips are integrally laterally joined to each other.

4. A method of making a flexible power transmission belt which comprises pressing a belt carcass comprising a resilient moldable material into molding contact with a ribbed mold to form a plurality of ribs upon a face of the carcass, and interposing a layer comprising a plurality of fabric strips disposed in lateral overlapping relationship with respect to one another and substantially parallel to the mold ribs between the carcass and the ribbed mold prior to the pressing operation to press a fabric liner over the surfaces of the carcass ribs, said layer of fabric strips prior to the pressing operation being disposed in plane-parallel relationship to a face of said carcass.

5. A method of making a flexible power transmission belt which comprises pressing a belt carcass comprising a resilient moldable material into molding contact with a ribbed mold to form a plurality of ribs upon a face of the carcass, and interposing a layer comprising a plurality of relatively movable fabric strips disposed in lateral overlapping relationship with respect to one another and substantially parallel to the mold ribs between the carcass and the ribbed mold prior to the pressing operation to press said layer in defining contact with the surfaces of the carcass ribs and lateral expansion of said layer to form a fabric for said carcass ribs.

6. A method of making a flexible power transmission belt from a carcass comprising a fabric planar face and a face comprising a relatively thick layer of relatively resilient moldable material with a strength layer interposed between said faces, which comprises pressing said carcass with the relatively resilient face into molding contact with a ribbed mold to form a plurality of ribs upon said carcass comprises of said relatively resilient material, and interposing a plurality of fabric strips disposed in lateral overlapping relationship with respect to one another and substantially parallel to the mold ribs between the relatively resilient face of the carcass and the ribbed mold prior to the pressing operation to press said strips as a fabric liner over the surfaces of the carcass ribs.

7. A method of making a flexible power transmission belt which comprises disposing a belt carcass comprising a resilient moldable material into contact with a ribbed mold, interposing a layer comprising a plurality of laterally relatively movable fabric strips disposed in lateral overlapping relationship with respect to one another and substantially parallel to the mold ribs between the carcass and the ribbed mold, pressing said carcass under pressure against said ribbed mold to form ribs upon said carcass and simultaneously displace adjacent strips laterally with respect to each other to cover said carcass ribs with said layer of fabric strips.

8. A method of making a flexible power transmission belt which comprises pressing a belt carcass comprising a resilient moldable rubber material into molding contact with a ribbed mold to form a plurality of ribs upon a face of the carcass, and interposing a plurality of rubberized relatively adhesive fabric strips disposed in lateral relatively movable overlapping relationship with respect to one another and substantially parallel to the mold ribs between the carcass and the ribbed mold in the form of a coherent layer prior to the pressing operation, said fabric strips moving laterally during said pressing operation and being pressed simultaneously into contact with the surfaces of said carcass ribs to form a fabric liner therefor.

9. A method of making a flexible power transmission belt which comprises pressing a belt carcass comprising a resilient moldable material into molding contact with a mold surface having ribs of substantially triangular section to form a plurality of triangular sectional ribs upon a face of the carcass, and interposing a plurality of fabric strips disposed in lateral overlapping relationship with respect to one another and substantially parallel to the mold ribs between the carcass and the ribbed mold prior to the pressing operation to press a fabric liner over the surfaces of the carcass ribs.

JAMES ADAMS, Jr.

REFERENCES CITED

The following references are of record in the file of this patent:

UNITED STATES PATENTS

| Number | Name | Date |
| --- | --- | --- |
| 1,656,628 | Gits | Jan. 17, 1928 |
| 2,065,180 | Freedlander | Dec. 22, 1936 |
| 2,294,821 | Yelm | Sept. 1, 1942 |
| 2,336,149 | Freedlander | Dec. 7, 1943 |
| 2,392,373 | Freedlander | Jan. 8, 1946 |

FOREIGN PATENTS

| Number | Country | Date |
| --- | --- | --- |
| 509,567 | Great Britain | July 18, 1939 |